(12) United States Patent
Evers et al.

(10) Patent No.: US 10,480,609 B2
(45) Date of Patent: Nov. 19, 2019

(54) PNEUMATIC ACTUATOR AND METHOD FOR OPERATING AN ACTIVE VIBRATION ISOLATION SYSTEM

(71) Applicant: Integrated Dynamics Engineering GmbH, Raunheim (DE)

(72) Inventors: Arndt Evers, Oestrich-Winkel (DE); Frank Hofmann, Rosbach (DE); Han Hartgers, Mainz (DE); Till Scharf, Heusenstamm (DE)

(73) Assignee: Integrated Dynamics Engineering GmbH, Raunheim (DE)

(*) Notice: Subject to any disclaimer, the term of this patent is extended or adjusted under 35 U.S.C. 154(b) by 0 days.

(21) Appl. No.: 15/619,211

(22) Filed: Jun. 9, 2017

(65) Prior Publication Data
US 2017/0370442 A1 Dec. 28, 2017

(30) Foreign Application Priority Data
Jun. 23, 2016 (EP) ..................................... 16175909

(51) Int. Cl.
*F16F 15/027* (2006.01)
*F16F 15/06* (2006.01)
(Continued)

(52) U.S. Cl.
CPC .......... *F16F 15/0275* (2013.01); *F16F 1/122* (2013.01); *F16F 15/063* (2013.01);
(Continued)

(58) Field of Classification Search
CPC ........ F16F 15/073; F16F 15/06; F16F 15/046; F16F 15/04; F16F 1/12; F16F 1/128;
(Continued)

(56) References Cited

U.S. PATENT DOCUMENTS 3,889,936 A    6/1975    Shimizu
5,090,299 A *   2/1992    Santi ..................... F04B 43/009
                                                                          92/98 D
(Continued)

FOREIGN PATENT DOCUMENTS

DE        4241997 C1 *   5/1994   ............. F15B 15/10
DE        4324595 C1     12/1994
(Continued)

OTHER PUBLICATIONS

"Search Report" issued in related co-pending EP patent application No. 16175910.5, dated Feb. 2, 2017.
(Continued)

*Primary Examiner* — Thomas J Williams
(74) *Attorney, Agent, or Firm* — Kaplan Breyer Schwarz, LLP

(57) ABSTRACT

A pneumatic actuator configured for a stationary vibration isolation system which serves to accommodate equipment for processing semiconductor devices. The pneumatic actuator comprises a working space with a piston which divides the working space into a first and a second pressure chamber, and the piston is spaced apart from an inner surface of the working space by a gap, and the piston is movable only in an axial direction.

12 Claims, 6 Drawing Sheets

(51) Int. Cl.
*F16F 1/12* (2006.01)
*F16F 3/02* (2006.01)
*F16F 15/04* (2006.01)

(52) U.S. Cl.
CPC ............... *F16F 1/128* (2013.01); *F16F 3/02* (2013.01); *F16F 15/046* (2013.01)

(58) Field of Classification Search
CPC .. F16F 3/02; F16F 3/023; F16F 15/027; F16F 15/0275; F16F 15/023; F16F 15/0232
USPC ........ 267/136, 140.11, 140.13, 140.3, 140.4, 267/122, 124; 248/560, 562, 605, 606, 248/610, 624, 636, 638
See application file for complete search history.

(56) References Cited

U.S. PATENT DOCUMENTS

| | | | |
|---|---|---|---|
| 5,111,735 A | 5/1992 | Johnson | |
| 5,121,898 A | 6/1992 | Yasuda et al. | |
| 5,267,725 A | 12/1993 | Wode et al. | |
| 6,322,060 B1 | 11/2001 | Mayama et al. | |
| 6,746,005 B1 | 6/2004 | Su et al. | |
| 7,095,482 B2 * | 8/2006 | Phillips | F16F 9/02 248/562 |
| 7,125,008 B2 * | 10/2006 | Hayashi | F16F 9/052 267/34 |
| 7,320,414 B2 * | 1/2008 | Davis | B67D 1/0037 222/129.1 |
| 7,552,620 B2 * | 6/2009 | DeRoos | G01N 15/0826 73/38 |
| 8,387,958 B2 * | 3/2013 | Heiland | F16F 9/04 248/562 |
| 8,556,047 B2 | 10/2013 | Kondou et al. | |
| 8,567,303 B2 * | 10/2013 | Ingersoll | F04B 43/0054 92/98 D |
| 9,618,076 B2 | 4/2017 | Kropp et al. | |
| 2006/0042059 A1 | 3/2006 | Satoh et al. | |
| 2007/0246871 A1 | 10/2007 | Hayashi | |
| 2009/0283942 A1 | 11/2009 | Nakamura | |
| 2010/0001445 A1 | 1/2010 | Maruyama et al. | |
| 2015/0260255 A1 | 9/2015 | Tan et al. | |
| 2016/0084339 A1 | 3/2016 | Evers | |
| 2017/0175845 A1 * | 6/2017 | Evers | F16F 9/0218 |
| 2017/0370441 A1 * | 12/2017 | Evers | F16F 15/0275 |

FOREIGN PATENT DOCUMENTS

| | | | |
|---|---|---|---|
| EP | 2759736 A2 | 7/2014 | |
| EP | 2998611 A1 | 3/2016 | |
| FR | 2993943 A1 * | 1/2014 | ............ F02B 37/186 |
| JP | 11-294520 A | 10/1999 | |
| JP | 200220690 A | 8/2000 | |
| SU | 612087 A1 * | 6/1978 | ............... F16J 15/52 |
| WO | 2008038433 A1 | 4/2008 | |

OTHER PUBLICATIONS

Integrated Dynamics Engineering GmbH, Related co-pending unpublished U.S. Appl. No. 15/619,088, filed Jun. 9, 2017.
"Search Report" issued in counterpart EP Application No. 16175909.7, dated Jan. 10, 2017.
Non-Final Office Action received for related U.S. Appl. No. 15/619,088, dated Oct. 4, 2018, 14 pages.
Communication from the Examining Division received for EP Patent Application No. 16175910.5 (foreign counter-part of related U.S. Appl. No. 15/619,088), dated Aug. 27, 2018, 2 pages.
Annex to the communication received for EP Patent Application No. 16175910.5 (foreign counter-part of related U.S. Appl. No. 15/619,088), dated Aug. 27, 2018, 3 pages.
Non-Final Rejection received for U.S. Appl. No. 15/619,088, dated Apr. 26, 2019, 10 pages.

* cited by examiner

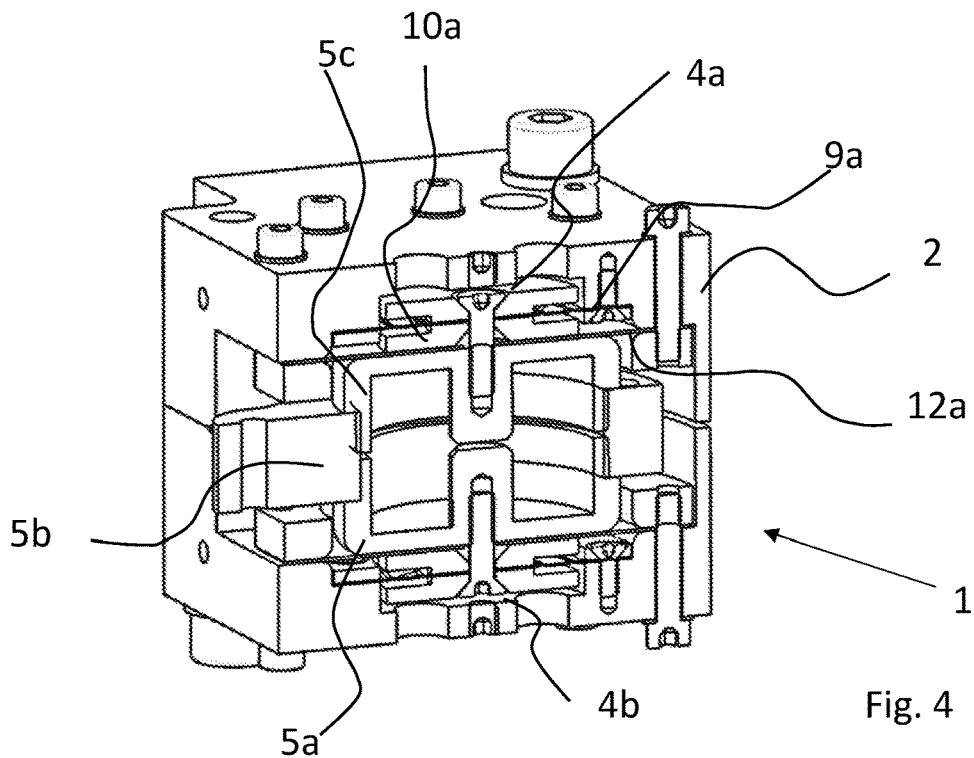
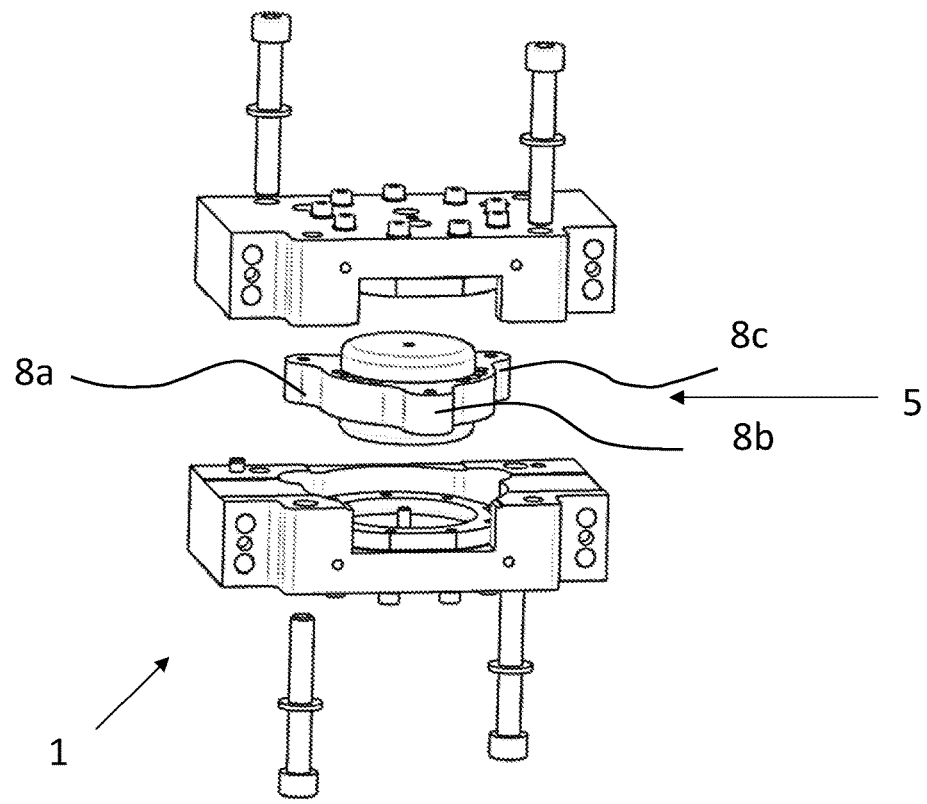
Fig. 4
Fig. 5

PNEUMATIC ACTUATOR AND METHOD FOR OPERATING AN ACTIVE VIBRATION ISOLATION SYSTEM

European Patent Application No. 16 175 909.7, filed on Jun. 23, 2016, is incorporated herein by reference.

FIELD OF THE INVENTION

The invention relates to a pneumatic actuator which is in particular configured for use in a stationary vibration isolation system.

The invention further relates to a method for operating an active vibration isolation system and to a vibration isolation system comprising a pneumatic actuator.

The invention in particular relates to stationary, i.e. immovably installed vibration isolation systems which are employed to support in vibration isolated manner lithography and/or metrology systems for the processing of semiconductor devices.

BACKGROUND OF THE INVENTION

Stationary vibration isolation systems such as employed in particular for supporting lithography or metrology devices for the processing of semiconductors usually consist of a table which is mounted on a plurality of isolators.

Known from practice are in particular active vibration isolation systems which comprise an active control system counteracting seismic vibrations or vibrations caused by the load (machines) to be isolated. For example, sensors arranged on the floor and/or on the load to be isolated may be used to measure vibrations. The acquired measurement values are used by a control device to actively generate compensation signals which are used to drive actuators for active vibration isolation. In practice, mostly magnetic actuators which are arranged in or on a pneumatic or mechanical (e.g. coil spring) isolator are used to produce counterforces.

With the size of the semiconductor devices to be processed, the size of the systems employed for this purpose also increases. Therefore, the reaction forces that need to be exerted by the actuators are higher and higher, which makes the use of electrically driven actuators more difficult. As a result, a plurality of actuators operating according to the magnetic principle have to be connected in parallel in one direction of action. This is complicated or even impossible in some applications due to the limited installation space available. The use of magnetic actuators is moreover limited by the always existing heat dissipation therefrom.

The need to drive magnetic actuators may certainly be reduced by incorporating a pneumatic level control of the vibration isolation system into the active vibration isolation. However, this is not always sufficient to eliminate the aforementioned drawbacks.

A mechanical vibration isolator comprising a coil spring is disclosed in published patent application EP 2 759 736 A2 (Integrated Dynamics Engineering GmbH).

Published patent application EP 2 998 611 A2 (Integrated Dynamics Engineering GmbH) discloses an isolator comprising an air spring with a characteristic that can be adapted through a replaceable leaf spring assembly and which comprises a bending pendulum to provide an isolating effect in horizontal direction.

However, pneumatic actuators known from practice, such as for example bellows cylinders, pneumatic muscles, and pneumatic cylinders are usually only effective in one direction and are not very suitable for the isolator of a generic stationary vibration isolation system, because of frictional forces existing between the cylinder and the piston, and/or because of force components existing transversely to the actual direction of action.

OBJECT OF THE INVENTION

Given this background, the invention is based on the object of mitigating the drawbacks of the prior art.

More particularly it is an object of the invention to provide a pneumatic actuator which is also suitable for stationary active vibration isolation systems.

SUMMARY OF THE INVENTION

The object of the invention is already achieved by a pneumatic actuator and by a method for operating an active vibration isolation system according to the illustrative embodiment disclosed herein.

The invention relates to a pneumatic actuator, that is in particular an actuator which is operated by air pressure.

The pneumatic actuator is in particular configured for use in a stationary vibration isolation system such as used for supporting in vibration isolated manner machines and systems for processing semiconductor devices.

The pneumatic actuator comprises a working space with a piston. The piston is able to move within the working space so as to generate a force in the axial movement direction of the piston.

The working space is divided by the piston into a first pressure chamber and a second pressure chamber, so that the piston can be subjected to a pressure from both sides, whereby a force can be generated in two opposite directions in a simple manner.

In order to minimize frictional forces and vibrations caused by a movement of the piston, the piston is spaced apart from the inner surface of the working space by a gap.

Thus, the piston is not guided by the cylinder defined by the working space, but rather is sufficiently spaced from the inner surface of the working space so that the piston does not engage the inner surface of the working space during normal operating conditions.

However, according to the invention the piston is only movable in an axial direction, that is to say in the direction of action of the piston, which means that the pneumatic actuator is designed to produce forces in exactly one spatial direction.

By preventing the piston from tilting or being displaced transversely to the direction of action, forces arising transversely to the desired direction of action when the actuator is driven are minimized or prevented.

In a preferred embodiment, the piston is guided axially by at least two leaf springs that are spaced apart from each other.

It is in particular contemplated that one leaf spring is arranged in the first pressure chamber and a further leaf spring is arranged in the second pressure chamber.

The leaf springs ensure that the piston is not tilted nor displaced transversely to the direction of action.

Preferably, the first and second pressure chambers and the leaf springs are substantially mirror-symmetric, i.e. they have approximately the same shape and the same dimensions.

In particular a leaf spring as described in EP 2 998 611 A1 can be used as the leaf spring, which has an inner ring and an outer ring.

Preferably, the first and second pressure chambers are each sealed by a membrane.

The membrane at least spans the gap between the piston and the inner surface.

In a preferred embodiment of the invention, the membrane spans the piston.

It is in particular contemplated to use a membrane that is fastened to the housing of the working space, in particular clamped by the housing of the working space, and which otherwise spans the entire working space and as such already closes the respective pressure chamber.

In this manner it is possible to provide a particularly light-weight sealing of the pressure chamber on the piston side.

In a preferred embodiment of the invention, the piston is connected to the respective leaf spring via a respective spacer projecting into the pressure chamber.

In this manner, the leaf spring may extend over a large area of the working space in the radial direction.

The spacer may furthermore be used to fix the membrane to the piston, as is contemplated according to one embodiment of the invention.

In another embodiment of the invention, the piston and the spacer are formed integrally.

The spacer may in particular be a central extension of the piston, which extends in the axial direction into the respective pressure chamber.

In a preferred embodiment of the invention, the piston comprises at least one extension protruding out of a lateral wall of the working space.

This extension may in particular be configured as a circumferential ring.

In a preferred embodiment of the invention, the piston comprises a plurality of laterally projecting extensions. In particular, the piston comprises at least three extensions projecting laterally, in the horizontal direction.

The extension(s) serve to couple the piston to the load to be isolated or to the base (floor).

For this purpose, the pneumatic actuator preferably has means for adding an isolation transversely to the axial direction.

The actuator is therefore decoupled from the base or from the load to be isolated transversely to its direction of action. This means that the stiffness of the actuator in this spatial direction is smaller, in particular at least 10 times smaller than the stiffness in the direction of action.

In particular in order for the piston to be subjected to a force in symmetrical manner, the coupling may be effected at least at three points distributed around the circumference of the piston.

Therefore, instead of an extension that is designed as a circumferential ring, it is also possible to use a plurality of individual extensions each one projecting out of the housing of the working space.

In particular bending rods, bending pendulums, cables, or wires can be used for coupling the piston to the base or to the load to be isolated.

The means for adding an isolation transversely to the axial direction are preferably arranged outside the working space of the piston.

It is in particular contemplated that the means which have an isolating effect transversely to the direction of action of the piston are arranged laterally adjacent to the working space of the piston.

The invention furthermore relates to an isolator for a vibration isolation system which comprises at least two of the pneumatic actuators described above, which are effective in different spatial directions.

It is in particular contemplated that the isolator comprises one vertically and one horizontally effective pneumatic actuator.

The isolator according to the invention is in particular designed as a pneumatic or as a mechanical isolator, in particular as a mechanical isolator comprising a coil spring, and comprises two pneumatic actuators in addition to a spring that is effective at least in the horizontal direction.

The invention moreover relates to an active vibration isolation system which comprises the pneumatic actuators described above. The vibration isolation system in particular comprises isolators each one comprising at least two pneumatic actuators.

In particular, a stationary active vibration isolation system is concerned which includes a control device connected to at least one sensor which detects vibrations of the floor and/or of the load to be isolated and generates compensation signals on the basis of the sensor signals, via feed-forward control.

The invention furthermore relates to a method for operating an active vibration isolation system, in particular a vibration isolation system as described above.

This method comprises driving pneumatic actuators which are effective in at least one direction, by a control device.

The control device is connected to valves for controlling the pressure in the working space of the pneumatic actuators.

The force exerted by the pneumatic actuators and/or the pressure in pressure chambers of the pneumatic actuators is measured by a sensor and gathered by the control device.

In order to generate compensation forces, the pneumatic actuators are controlled by the control device which adjusts the pressure in the working space of the actuator via a valve.

The pressure is controlled taking into account the non-linear characteristic of the fluid in the pressure chambers.

In contrast to a hydraulic fluid, air is compressible, and therefore, for example, the opening duration of a valve which allows air to flow into the working space of the actuator is not proportional to the force resulting therefrom.

This can be compensated for by a digital or analog control filter, for example. A proportional slide valve, a proportional pressure valve, or a fast switching valve may also be used.

The pneumatic actuator used for the method produces a force in at least one direction. Preferably, a pneumatic actuator as described above is used, that is an actuator which is capable of producing a force in two opposite directions.

BRIEF DESCRIPTION OF THE DRAWINGS

The subject matter of the invention will now be described in more detail by way of a schematically illustrated exemplary embodiment and with reference to the drawings of FIGS. 1 to 8.

FIG. 4 shows a sectional view of an exemplary embodiment of an actuator according to the invention.

FIGS. 5 and 6 are exploded views of the actuator.

DETAILED DESCRIPTION

Figure 1:
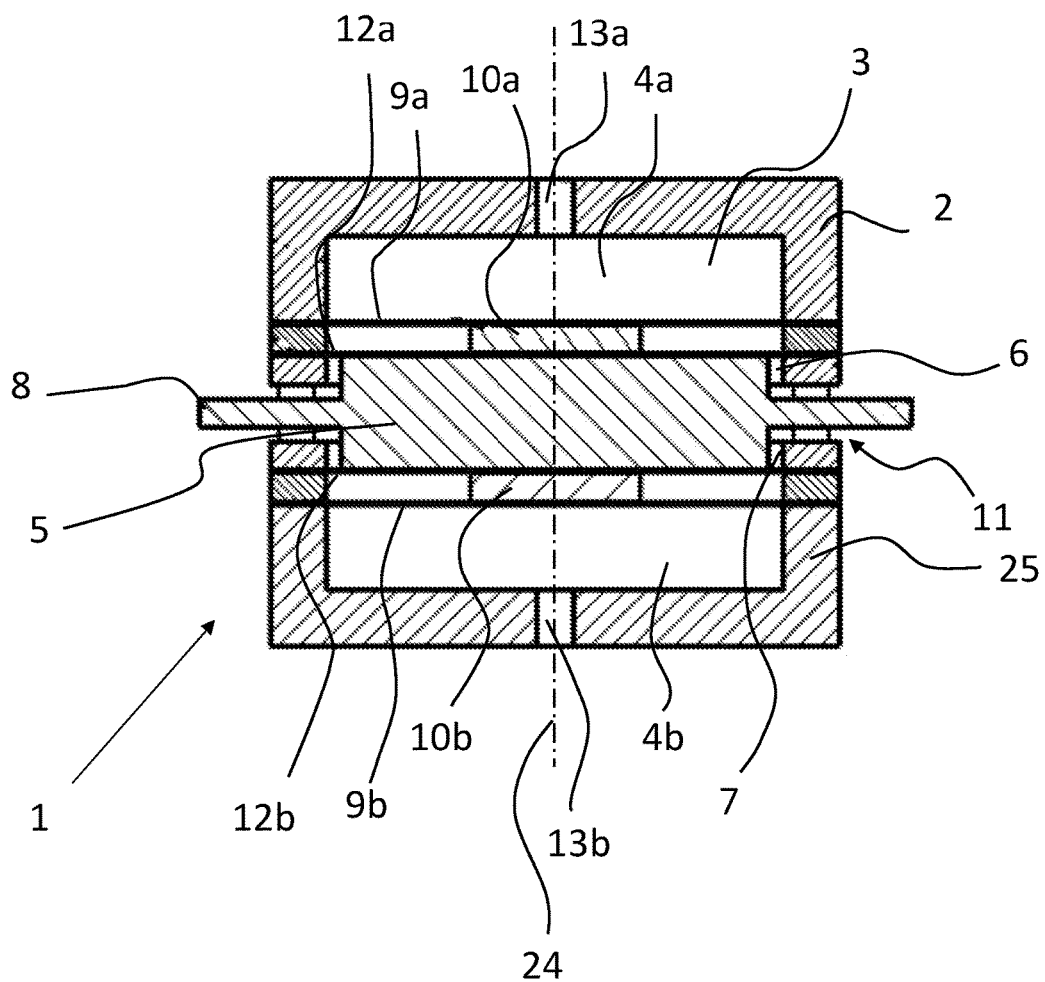
FIG. 1 shows a schematic sectional view of an exemplary embodiment of a pneumatic actuator according to the invention.

FIG. 1 is a schematic sectional view of an exemplary embodiment of an actuator 1 according to the invention.

Pneumatic actuator 1 comprises a housing 2 enclosing a working space 3 in which a piston 5 is able to move. The working space defines a working volume into which compressed air can be directed.

Working space 3 is divided, by piston 5, into a first pressure chamber 4a and a second pressure chamber 4b.

Pressure chamber 4a comprises pneumatic port 13a, and pressure chamber 4b comprises pneumatic port 13b.

Compressed air can be introduced into the otherwise sealed pressure chambers 4a and 4b via ports 13a and 13b.

In this manner, a force can be produced in the axial direction, that is a force along axis 24, by means of piston 5.

In contrast to known pneumatic cylinders, a gap 6 is provided between the inner surface 7 of the housing 2 of working space 3 and the piston 5, and as a result thereof no friction forces will arise during a movement of the piston 5. Gap 6 has a width of at least 0.1 mm, preferably at least 0.5 mm, and most preferably at least 1 mm.

For sealing the pressure chambers 4a and 4b so as to prevent fluid from escaping through gap 6, a respective elastic membrane 12a, 12b is provided spanning at least the gap 6.

In the present exemplary embodiment, the membrane 12a, 12b spans the entire piston 5 while being connected to the piston 5 at the same time.

Furthermore, the membrane 12a, 12b is clamped along its edge in the lateral wall 25 of housing 2.

For guiding the piston 5 in the axial direction, a respective leaf spring 9a, 9b is provided in both the pressure chamber 4a and pressure chamber 4b and is connected to the piston 5 via a respective spacer 10a and 10b.

Leaf springs 9a and 9b are also fastened to the lateral wall 25 of working space 3, in particular clamped in lateral wall 25.

Preferably, the leaf springs 9a, 9b are fastened within pressure chambers 4a and 4b, respectively, in order to avoid otherwise necessary sealing means.

Leaf springs 9a and 9b extend perpendicularly to the axis 24 and may in particular be configured as a leaf spring having an inner ring and an outer ring.

Spacers 10a, 10b are respectively secured on either side of the piston 5, and in the present exemplary embodiment they additionally serve to fasten the membrane 12a, 12b to the piston 5.

In the present exemplary embodiment, the pneumatic actuator has an essentially rotationally symmetric shape with respect to the axis 24 which extends centrally through the pneumatic actuator 1 in the direction of action thereof.

Furthermore, the first and second pressure chambers 4a, 4b with leaf springs 9a, 9b and membranes 12a, 12b are substantially configured identically. Leaf springs 9a and 9b are installed in mirror-symmetric manner in terms of their shape and function.

The lateral wall 25 of housing 2 has an opening 11 from which an extension 8 is protruding perpendicularly to the axis 24.

It will be understood that the extension 8 has sufficient clearance within the opening 11 so that it will not engage on lateral wall 25 during operation of the pneumatic actuator 1.

In the present exemplary embodiment, extension 8 is configured as a circumferential ring. The extension 8 may have openings, with components extending therethrough, by means of which the two halves of the housing 2 are coupled (not shown).

Extension 8 serves to couple the piston 5 to the base or to the load to be isolated.

It will be understood that instead of a circumferential ring it is likewise possible that a plurality of extensions (not shown) are provided distributed around the circumference of the pneumatic actuator 1.

Figure 2:
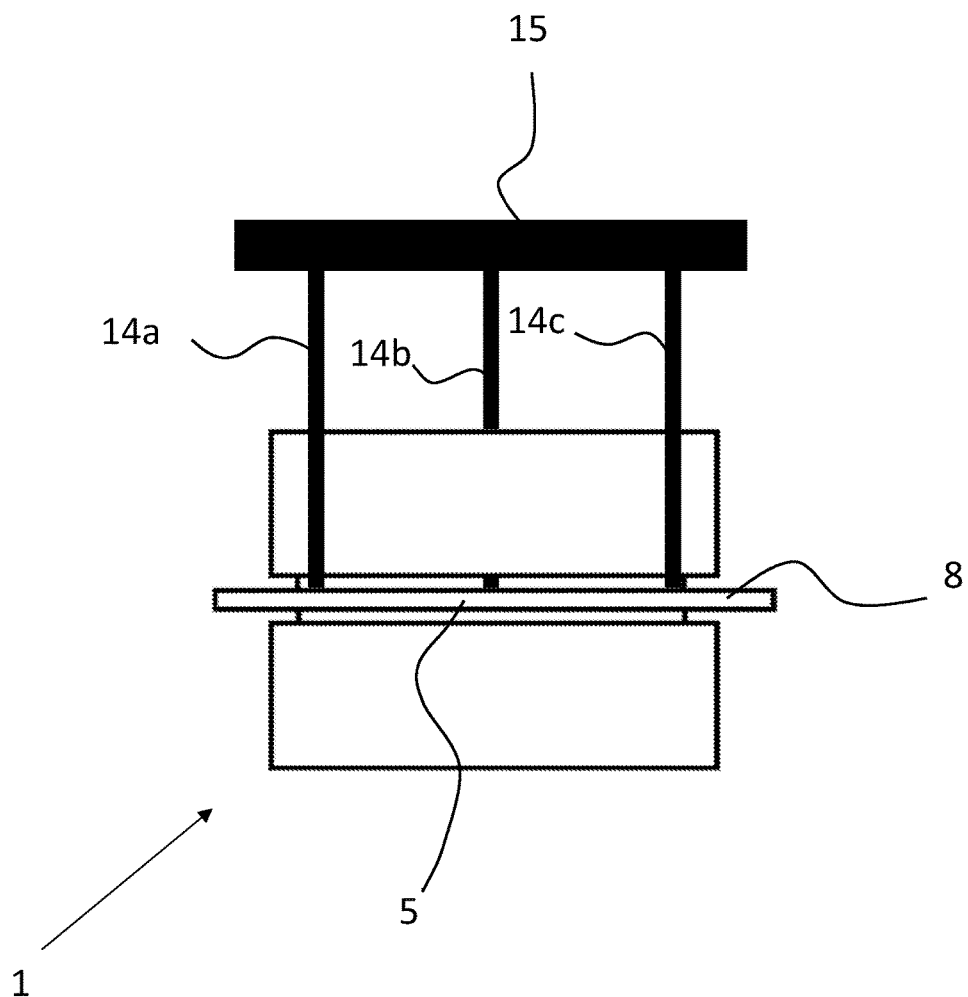
FIG. 2 is an elevational side view of the actuator, now illustrating additional means for providing an isolation transversely to the direction of action thereof.

FIG. 2 is a schematic elevational side view of pneumatic actuator 1, and this view moreover shows the components which couple the piston 5 to the load 15 to be isolated (or to the base).

In this exemplary embodiment, three bending rods 14a to 14c on extension 8 are distributed uniformly around the circumference of extension 8 and are connected to the load 15 to be isolated.

Bending rods 14a to 14c provide isolation transversely to the effective axis of the pneumatic actuator 1.

Bending rods 14a to 14c exhibit high stiffness in the direction of action (axis 24 in FIG. 1), but yield to a force acting transversely thereto, thus decoupling the base and the load to be isolated transversely to the direction of action of the pneumatic actuator 1.

Figure 3:
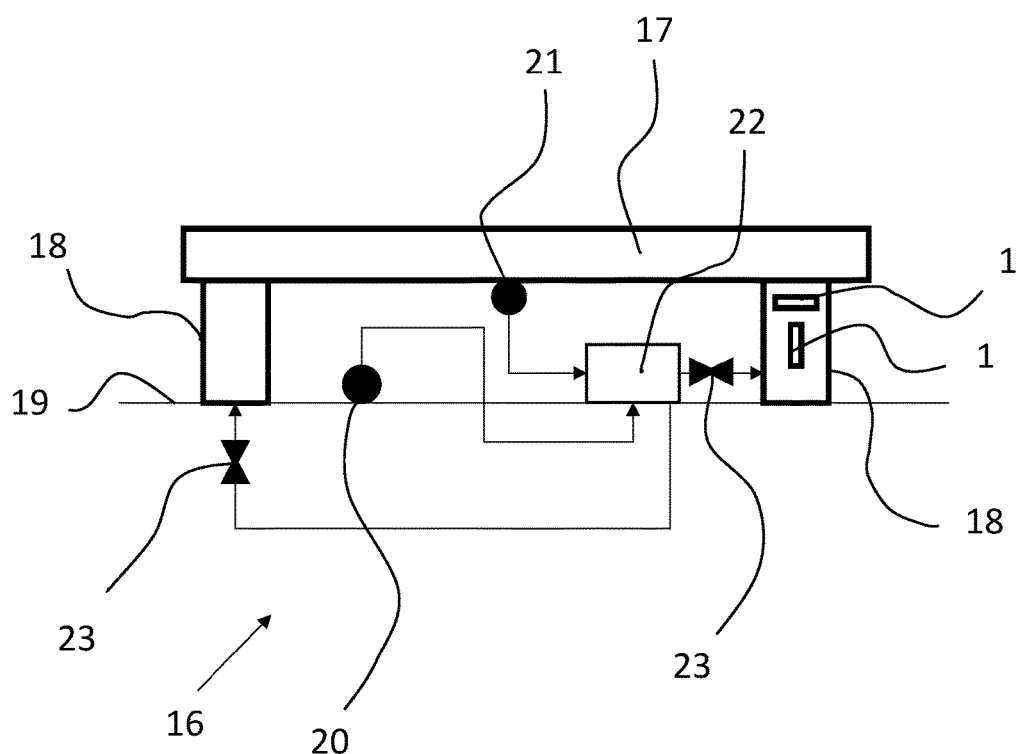
FIG. 3 is a schematic diagram of a vibration isolation system with isolators comprising actuators according to the invention.

FIG. 3 is a schematic view of a vibration isolation system 16.

Vibration isolation system 16 comprises a table 17 mounted for vibration isolation, on which in particular lithography and metrology systems for processing semiconductor devices (not shown) can be arranged.

Table 17 rests on a plurality of isolators 18 which are coupled to the floor 19.

Isolators 18 can be configured as pneumatic or mechanical springs.

Isolators 18 comprise at least two of the pneumatic actuators 1 described above, one actuator that is effective in the horizontal spatial direction and one actuator that is effective in the vertical spatial direction.

It will be appreciated that the vibration isolation system may comprise further actuators, in particular magnetic actuators based on the voice coil principle.

In the present exemplary embodiment, seismic vibrations are detected by sensor 20, and vibrations of the load to be isolated, that is the table 17 with the assemblies arranged thereon, are detected by sensor 21.

A control device 22 generates compensation signals on the basis of the signals from sensors 21 and 20, thereby controlling valves 23 through which the pressure in the pressure chambers of the pneumatic actuators 1 is adjusted.

It goes without saying that a respective valve will be provided for each port of a pressure chamber, although only one respective valve 23 is schematically illustrated in this exemplary embodiment.

In order to take account of the fact that air is compressible, the actuators 1 may be controlled via a feed-forward control on the basis of the pressure in the pressure chambers or on the basis of a force measured by means of a sensor (not illustrated).

An exemplary embodiment of an actuator according to the invention will now be explained in more detail with reference to FIGS. 4 to 7.

FIG. 4 is a perspective cutaway view of a pneumatic actuator 1.

In this exemplary embodiment, the piston consists of the three parts 5a to 5c.

In this exemplary embodiment, again, the piston consisting of parts 5a to 5c divides the working space into two pressure chambers 4a, 4b.

Spacer 10a clamps the leaf spring 9a and the membrane 12a to the piston.

It goes without saying that the lower pressure chamber arranged in mirror symmetry thereto is configured similarly.

FIG. 5 is an exploded view of the actuator illustrated in FIG. 4.

The two parts of the housing (2 in FIG. 4) are now separated from each other and the piston 5 can be seen, consisting of three parts (5a to 5c in FIG. 4).

It can be seen that the piston 5 has three extensions 8a to 8c which protrude laterally outwards and which are distributed around the circumference of the piston 5 with a respective spacing of 120° in this exemplary embodiment.

Figure 6:
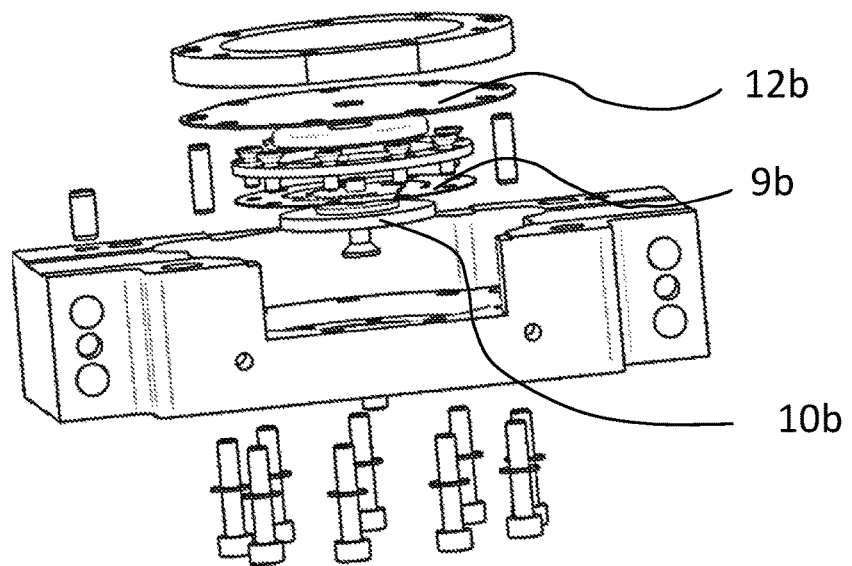

FIG. 6 is a further exploded view in which the upper housing part and the piston are omitted.

Here, especially the spacer 10b can be seen, which is used to attach the leaf spring 9b and the membrane 12b to the piston.

Leaf spring 9b is substantially circular in shape and comprises an inner ring and an outer ring.

Figure 7:
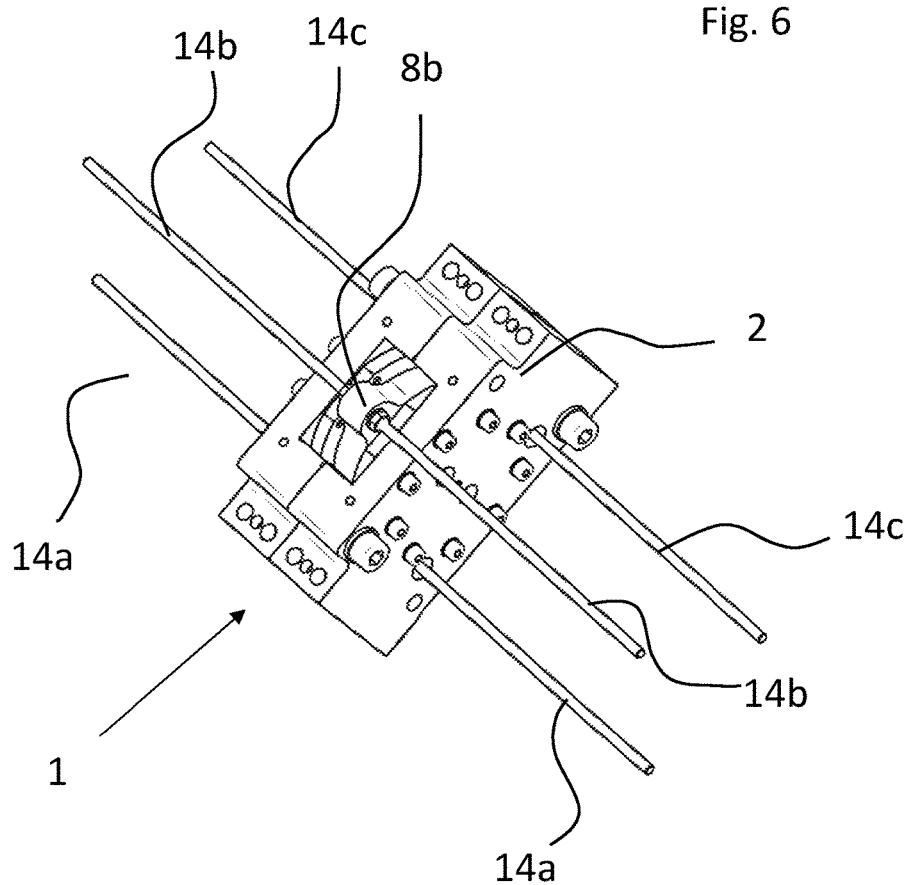
FIG. 7 is a perspective view of the actuator with bending rods already mounted thereto.

FIG. 7 shows the previously illustrated actuator 1, and now 3 respective bending bars 14a to 14c are mounted on either side, which serve to provide isolation perpendicularly to the direction of action of actuator 1.

It can be seen that the extension 8b protrudes laterally out of housing 2 of the actuator.

The extensions for bending rods 14a and 14c are located inside the housing. Accordingly, two bores are provided in the housing for extending the bending rods 14a and 14c therethrough.

Figure 8:
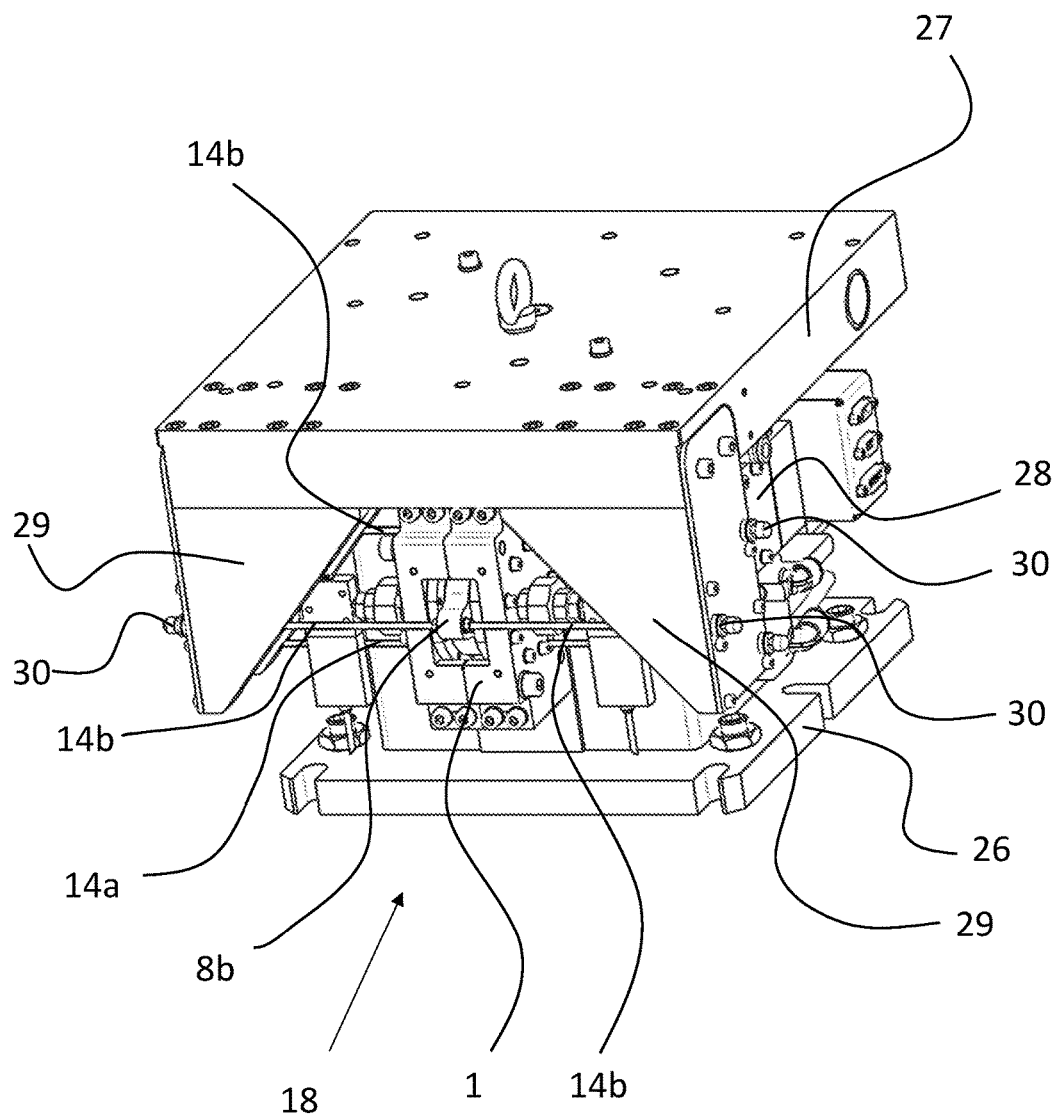
FIG. 8 is a perspective view of an isolator according to the invention with the actuator of FIGS. 4 to 7 installed therein.

FIG. 8 is a perspective view of an isolator 18 in which the actuator 1 illustrated in FIGS. 4 to 7 is installed for active vibration isolation.

The actuator 1 illustrated herein is used to generate compensation forces in the horizontal direction.

Isolator 18 comprises a housing 28 accommodating a spring that is preferably effective in both the vertical and the horizontal directions, for isolation purposes. The spring is preferably configured as a pneumatic spring (not shown).

The housing 28 is connected to a base part 26 which provides the connection to the ground.

The upper part 27 is supported in vibration isolated manner on the spring and is used for coupling to the load to be isolated.

The actuator 1 is mounted to the housing 28.

The upper part 27 has brackets 29 to which the bending rods 14a to 14b are mounted.

The bending rods 14a to 14c couple the upper part, that is the vibration isolated load, to the actuator 1.

In particular bending rods 14b which are connected to extension 8b are visible here.

Bending rods 14a to 14c are preloaded by means of screws 30.

During operation of the actuator, the bending rods 14a to 14c are only loaded by tension and decouple the actuator 1 in the vertical direction from the load that is supported in vibration isolated manner.

It will be understood that the isolator 18 preferably additionally comprises a further actuator 1 which is effective in the vertical direction (not visible).

The invention permits to provide a compact actuator which is capable of generating high forces and which is in particular suitable for replacing a magnetic actuator.

LIST OF REFERENCE NUMERALS

1 Pneumatic actuator
2 Housing
3 Working space
4a, 4b Pressure chamber
5 Piston
5a-5c Part
6 Gap
7 Inner surface
8, 8a-8c Extension
9a, 9b Leaf spring
10a, 10b spacer
11 Opening
12a, 12b Membrane
13a, 13b Port
14a-14c Bending rod
15 Load
16 Vibration isolation system
17 Table
18 Isolator
19 Floor
20 Sensor
21 Sensor
22 Control device
23 Valve
24 Axis
25 Lateral wall
26 Base
27 Upper part
28 Housing
29 Bracket
30 Screw

What is claimed is:

1. A pneumatic actuator for a stationary vibration isolation system, comprising a working space with a piston that divides the working space into a first pressure chamber and a second pressure chamber, wherein the piston is spaced apart from an inner surface of the working space by a gap so that the piston is not guided by the inner surface of the working space, wherein the piston is movable only in an axial direction, and wherein the piston is guided axially by at least two leaf springs that are spaced apart from each other.

2. The pneumatic actuator as claimed in claim 1, wherein one leaf spring is arranged in the first pressure chamber and a further leaf spring is arranged in the second pressure chamber.

3. The pneumatic actuator as claimed in claim 1, wherein the first and second pressure chambers are each sealed by a membrane.

4. The pneumatic actuator as claimed in claim 3, wherein the membrane spans the piston.

5. The pneumatic actuator as claimed in claim 1, wherein the piston is connected to the leaf springs with spacers.

6. The pneumatic actuator as claimed in claim 5, wherein one of the spacers protrudes into the first pressure chamber and the other one of the spacers protrudes into the second pressure chamber.

7. The pneumatic actuator as claimed in claim 1, wherein the piston has at least one extension protruding out of a lateral wall of the working space.

8. The pneumatic actuator as claimed in claim 1, wherein the piston has a plurality of laterally projecting extensions.

9. The pneumatic actuator as claimed in claim 1, wherein the piston is connected to a load to be isolated or to a base via at least one bending rod, a bending pendulum, a cable, or a wire.

10. The pneumatic actuator as claimed in claim 9, wherein the piston is connected to the load to be isolated or to a base through a plurality of bending rods, bending pendulums, cables, or wires distributed around the circumference of the piston.

11. An isolator for a vibration isolation system, comprising at least two pneumatic actuators according to claim 1, wherein the at least two pneumatic actuators are effective in different directions.

12. An active vibration isolation system, comprising isolators with pneumatic actuators according to claim 11.

* * * * *